US010363622B2

(12) United States Patent
Luo et al.

(10) Patent No.: US 10,363,622 B2
(45) Date of Patent: Jul. 30, 2019

(54) ELECTRODE FOR AN ELECTRO-EROSION PROCESS AND AN ASSOCIATED METHOD THEREOF

(71) Applicant: General Electric Company, Schenectady, NY (US)

(72) Inventors: Yuanfeng Luo, Rexford, NY (US); Andrew Lee Trimmer, Niskayuna, NY (US); Bernard Adel Ibrahim, Canton, MI (US); Dale Robert Lombardo, Clifton Park, NY (US); John Anthony Vogel, Charlton, NY (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 15/281,127

(22) Filed: Sep. 30, 2016

(65) Prior Publication Data

US 2018/0093337 A1 Apr. 5, 2018

(51) Int. Cl.
*B23H 1/04* (2006.01)
*B23H 7/12* (2006.01)
(Continued)

(52) U.S. Cl.
CPC ............... *B23H 1/04* (2013.01); *B23H 1/10* (2013.01); *B23H 7/12* (2013.01); *B23H 3/04* (2013.01);
(Continued)

(58) Field of Classification Search
CPC ........ B23H 1/04; B23H 2400/00; B32H 7/12; B32H 2400/10
See application file for complete search history.

(56) References Cited

U.S. PATENT DOCUMENTS 3,476,676 A * 11/1969 Johnson .................. B23H 7/12
204/215
3,565,775 A 2/1971 Bouchet et al.
(Continued)

FOREIGN PATENT DOCUMENTS

DE 10145006 A1 4/2003
JP 56-107837 A * 8/1981
(Continued)

OTHER PUBLICATIONS

Extended European Search Report and Opinion issued in connection with corresponding EP Application No. 17192358.4 dated Feb. 26, 2018.
(Continued)

*Primary Examiner* — Geoffrey S Evans
(74) *Attorney, Agent, or Firm* — Ziolkowski Patent Solutions Group, SC

(57) ABSTRACT

Electrode for an electro-erosion process, includes a shaft, a body coupled to the shaft, a plurality of machining-inserts, an insulated layer, and a flushing cover disposed on the body and coupled to the shaft. The shaft includes a channel, a plurality of first openings and second openings, each opening connected to the channel. The body includes a plurality of main-flushing channels, where each channel is connected to a corresponding first opening. The plurality of machining-inserts is spaced apart from each other along a circumferential direction and detachably coupled to a peripheral end portion of the body. Each machining-insert includes at least one third opening connected to a corresponding main-flushing channel. The insulated layer is disposed on top and bottom surfaces of the body. The flushing cover includes a plurality of side-flushing channels and a plurality of fourth openings, where each channel is connected to a corresponding second opening.

15 Claims, 8 Drawing Sheets

(51) Int. Cl.
  *B23H 1/10* (2006.01)
  *B23H 3/04* (2006.01)
  *B23H 3/10* (2006.01)
  *B23H 7/22* (2006.01)
  *B23H 7/36* (2006.01)

(52) U.S. Cl.
  CPC .......... *B23H 3/10* (2013.01); *B23H 7/22* (2013.01); *B23H 7/36* (2013.01); *B23H 2400/10* (2013.01)

(56) References Cited

U.S. PATENT DOCUMENTS

| | | | | |
|---|---|---|---|---|
| 3,663,787 | A * | 5/1972 | Haswell, III | B23H 1/00 219/69.14 |
| 3,801,770 | A * | 4/1974 | O'Connor | B23H 1/00 204/198 |
| 6,604,894 | B1 | 8/2003 | Noggle | |
| 6,974,280 | B2 | 12/2005 | Satran et al. | |
| 7,303,461 | B1 | 12/2007 | Campomanes et al. | |
| 8,183,491 | B2 * | 5/2012 | Luo | B23H 9/10 219/69.11 |
| 8,881,352 | B2 | 11/2014 | Meidar et al. | |
| 8,999,136 | B2 * | 4/2015 | Cantelli | B23H 7/20 204/224 M |
| 2012/0211357 | A1 | 8/2012 | Trimmer et al. | |
| 2012/0285820 | A1 | 11/2012 | Li et al. | |
| 2015/0014281 | A1 | 1/2015 | Trimmer et al. | |

FOREIGN PATENT DOCUMENTS

| | | | |
|---|---|---|---|
| JP | 03-166018 A | * | 7/1991 |
| JP | 03-166019 A | * | 7/1991 |
| JP | 04-304928 A | * | 10/1992 |
| JP | 5023655 B2 | | 9/2012 |

OTHER PUBLICATIONS

W. Graham et al., "Some observations of through-wheel coolant application in grinding", International Journal of Machine Tool Design and Research, vol. 18, Issue: 1, Nov. 1977, pp. 9-18.

Yussefian, "Electro-erosion edge honing of cutting tools", CIRP Annals—Manufacturing Technology, vol. 59, Issue: 1, Mar. 2010, pp. 215-218.

* cited by examiner

ELECTRODE FOR AN ELECTRO-EROSION PROCESS AND AN ASSOCIATED METHOD THEREOF

BACKGROUND

Embodiments of the present invention relate to an electrode for an electro-erosion process, and to a method of manufacturing such an electrode.

Electro-machining is a process for applying electric energy to a workpiece and an electrode to effect removal of material from the workpiece. Generally, electro-machining processes are divided into two categories based on the material removal process. The first category of electro-machining processes is electric-discharge machining (EDM), in which thermal energy flows between the electrode and the workpiece, causing material to be removed from the workpiece. The second category of electro-machining processes is electro-chemical machining (ECM), in which an oxidation reaction occurs at the workpiece due to a chemical potential difference from an applied electric field and material is removed from the workpiece.

In addition, there is another technology utilizing thermal energy to drive material removal, i.e., high speed electro-erosion (HSEE), which has been used for machining difficult-to-machine, high-performance alloy workpieces. Generally, the HSEE process is applied to electrically conductive workpieces. In the HSEE process, the material removal takes place mainly due to the effect of thermal action but some electro-chemical reaction may also occur.

Generally, electrodes used in the conventional electro-erosion process have a flushing channel to direct flushing fluids to the cutting zone. The flushing fluids may cool the workpiece and simultaneously eject the removed material from the workpiece. However, accumulation of the removed material on non-cutting zones of the workpiece may result in drawing excess current and result in generation of undesirable arcs between the electrode and the workpiece. Thus, a conventional electrode may not be suitable for high speed cutting of a workpiece. Further, the fabrication of a substantially large and thin electrode, with multiple flushing channels, is difficult using the traditional drilling method.

Accordingly, there is need for a new and improved electro-erosion electrode with unique flushing geometries and a method for fabricating such an electrode.

BRIEF DESCRIPTION

In accordance with one embodiment, an electrode for an electro-erosion process is disclosed. The electrode includes a shaft, a body coupled to the shaft, a plurality of machining-inserts, an insulated layer, and a flushing cover disposed on the body and coupled to the shaft. The shaft includes a channel, a plurality of first openings, and a plurality of second openings, where each opening of the plurality of first and second openings is connected to the channel. The body includes a plurality of main-flushing channels, where each main-flushing channel is connected to a corresponding first opening. The plurality of machining-inserts is spaced apart from each other along a circumferential direction of the electrode and detachably coupled to a peripheral end portion of the body. Each machining-insert includes at least one third opening connected to a corresponding main-flushing channel. The insulated layer is disposed on a top surface and a bottom surface of the body. The flushing cover includes a plurality of side-flushing channels and a plurality of fourth openings, where each side-flushing channel is connected to a corresponding second opening.

In accordance with another embodiment, a method for manufacturing an electrode for an electro-erosion process is disclosed. The method involves machining a shaft to form a channel, a plurality of first openings, and a plurality of second openings, where each opening of the plurality of first and second openings is connected to the channel. Further, the method involves machining a body to form a plurality of main-flushing channels, where each main-flushing channel is connected to a corresponding first opening. The method further involves coupling the shaft to the body such that each main-flushing channel is connected to a corresponding first opening. Further, the method involves detachably coupling a plurality of machining-inserts to a peripheral end portion of the body. The plurality of machining-inserts is spaced apart from each other along a circumferential direction of the electrode and each machining-insert includes at least one third opening connected to a corresponding main-flushing channel. The method further involves disposing an insulated layer on a top surface and a bottom surface of the body and disposing a flushing cover on the body, where the flushing cover includes a plurality of side-flushing channels and a plurality of fourth openings. The method further involves coupling the flushing cover to the shaft such that each side-flushing channel is connected to a corresponding second opening.

In accordance with yet another embodiment, a method for operating an electrode in an electro-erosion process is disclosed. The method involves rotating a body of the electrode through a shaft coupled to the body. The electrode includes the shaft, a flushing cover disposed on the body and coupled to the shaft, and a plurality of machining-inserts spaced apart from each other along a circumferential direction of the electrode and detachably coupled to a peripheral end portion of the body. The method further involves supplying power to the electrode and a work piece via a power source. Further, the method involves removing at least a portion of a material from the work piece through primary arcs generated between the electrode and the work piece. The method further involves injecting a portion of a flushing fluid directly over the work piece from a plurality of first openings disposed in each machining-insert to eject a removed portion of the material from the work piece. Each first opening is connected to a main-flushing channel disposed in the body and to a channel disposed in the shaft. Further, the method involves injecting another portion of the flushing fluid along a recess portion defined between the plurality of machining-inserts and the flushing cover, from a plurality of second openings disposed in the flushing cover to further eject the removed portion of the material from the work piece. Each second opening is connected to a side-flushing channel disposed in the flushing cover and to the channel disposed in the shaft.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
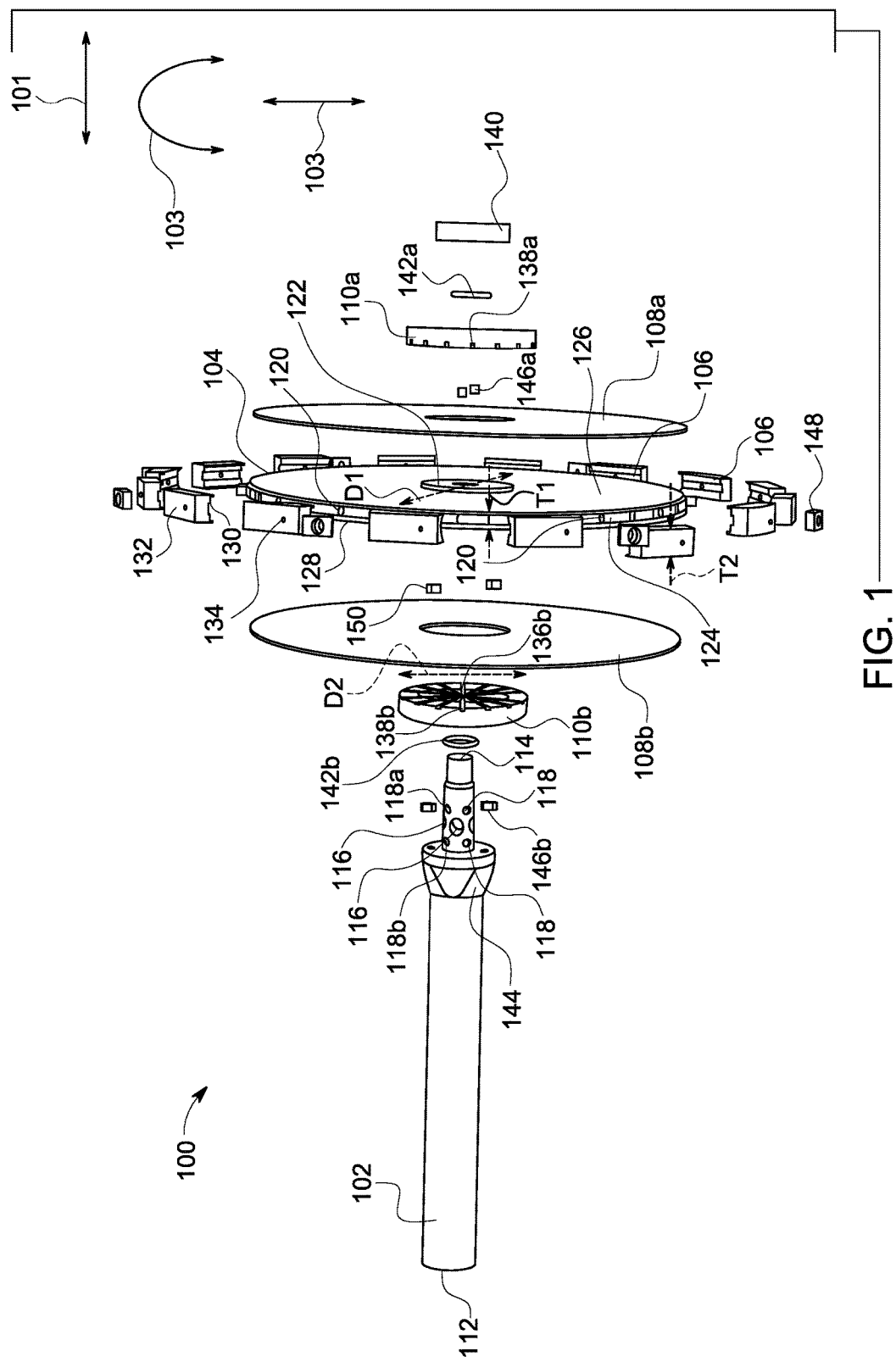
FIG. 1 is an exploded perspective view of an electrode in accordance with one embodiment of the present disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this description belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. In the following specification and the claims that follow, the singular forms "a", "an" and "the" include plural referents unless the context clearly dictates otherwise.

Embodiments of the present invention discussed herein relate to a metal cutting disk tool, such as an electrode used in an electro-machining system, such as an electro-erosion. The electrode includes a shaft, a body coupled to the shaft, a plurality of machining-inserts, an insulated layer, and a flushing cover disposed on the body and coupled to the shaft. The plurality of machining-inserts is detachably coupled to a peripheral end portion of the body and is distributed evenly along a circumferential direction of the electrode. The machining-inserts is configured for removal of a portion of a material from a work piece. The shaft includes a channel for supplying a flushing fluid from a fluid source to the body and the flushing cover, thereby function as a through-shaft. Similarly, the body has a plurality of main-flushing channels for injecting a portion of the flushing fluid to a cutting zone via a corresponding machining-insert, to eject the removed portion of the material from the work piece, thereby function as a through-body. The flushing cover includes a plurality of side-flushing channels for injecting another portion of the flushing fluid to further eject the removed portion of the material from the work piece. The insulated layer disposed on a top surface and a bottom surface of the body, is configured to prevent generation of arcs (i.e. secondary arcs) between the electrode and the work piece or the removed portion of the material.

During operation, the electrode is disposed proximate to the work piece and power is supplied to the electrode and the work piece for removal of the portion of the material (debris) from the work piece. The electrode is rotated by a motor coupled to the shaft, with the through-shaft flushing fluid supply to function like a simple centrifugal pump, thus enabling higher flushing fluid pressure. Further, the through-body flushing exit injects the flushing fluid directly on the cutting zone, cools the cutting zone, and ejects the debris directly from the workpiece, thereby enhancing the through-body flushing. The high flushing fluid pressure will provide higher debris ejection forces and thus support higher material removal rates. The plurality of machining-inserts may be replaced after worn out and the arrangement of the machining-inserts may cut off the generation of primary arcs, mechanically. The machining-insert is thicker (or wider) than the body, thereby provide more space for removal of debris, add an insulation layer, which will further help to avoid i) generation of secondary arc (or discharge) and ii) draw more current from the power source, when debris accumulates on sidewalls of the electrode.

Accordingly, in group of embodiments provided herein is an electrode (100) for an electro-erosion process, comprising: a shaft (102) comprising a channel (115); a body (104) coupled to the shaft (102) and comprising a plurality of main-flushing channels (120); a plurality of machining-inserts (106) spaced apart from each other along a circumferential direction of the electrode (100), wherein each machining-insert (106) comprises at least one opening (134) connected to a corresponding main-flushing channel (120); an insulated layer (108) disposed on a top surface (126) and a bottom surface (128) of the body (104); and a flushing cover (110) disposed on the body (104) and coupled to the shaft (102) and comprising a plurality of side-flushing channels (136), wherein each side-flushing channel (136*a*, 136*b*) is connected to the channel (115).

In one embodiment, the electrode (100) for an electro-erosion process includes the shaft (102), the body (104) coupled to the shaft (102), the plurality of machining-inserts (106), the insulated layer (108), and the flushing cover (110) disposed on the body (104) and coupled to the shaft (102). The shaft (102) includes a channel (115), a plurality of first openings (116), and a plurality of second openings (118), where each opening of the plurality of first and second openings (116, 118) is connected to the channel (115). The body includes a plurality of main-flushing channels (120), where each main-flushing channel (120) is connected to a corresponding first opening (116). The plurality of machining-inserts (106) is spaced apart from each other along a circumferential direction of the electrode (100) and detachably coupled to a peripheral end portion (124) of the body (104). Each machining-insert (106) includes at least one third opening (134) connected to a corresponding main-flushing channel (120). The insulated layer (108) is disposed on a top surface (126) and a bottom surface (128) of the body (104). The flushing cover (110) includes a plurality of side-flushing channels (136) and a plurality of fourth openings (138*a*, 138*b*), where each side-flushing channel (136*a*, 136*b*) is connected to a corresponding second opening (118).

FIG. 1 is an exploded perspective view of an electrode 100 of the present disclosure. In some embodiments, the electrode 100 is used in an electro-erosion process and configured to remove a portion of material from a work piece (not shown in FIG. 1). In one embodiment, the electrode 100 includes a shaft 102, a body 104 coupled to the shaft 102, a plurality of machining-inserts 106, a plurality of insulated layers 108a, 108b, a first flushing cover 110a, and a second flushing cover 110b. The first and second flushing covers 110a, 110b are disposed on the body 104 and coupled to the shaft 102.

The shaft 102 includes a first end 112, a second end 114, a channel (not shown in FIG. 1), a plurality of first openings 116, and a plurality of second openings 118. In one embodiment, the channel may be disposed within the shaft 102 and extend along a lateral direction 101 of the electrode 100 between the first and second ends 112, 114. The first end 112 may be coupled to a motor (not shown in FIG. 1) and a flushing fluid source (not shown in FIG. 1). The plurality of first openings 116 is disposed proximate to the second end 114 and each of the plurality of first openings 116 is connected to the channel. The plurality of second openings 118 is disposed around the plurality of first openings 116 and each of the plurality of second openings 118 is connected to the channel. In the illustrated embodiment, the plurality of second openings 118 includes a first set of second openings 118a and a second set of second openings 118b. The plurality of first openings 116 is disposed between the first set of second openings 118a and the second set of second openings 118b. In certain embodiments, the plurality of first and second openings 116, 118 are disposed spaced apart from each other along a circumferential direction 103 of the electrode 100.

In one embodiment, the body 104 is a donut-shaped disk. The body 104 includes two halve portions (not shown in FIG. 1) coupled to each other to define a plurality of main-flushing channels 120 there between the two halve portions. The plurality of main-flushing channels 120 extends between an inner peripheral end portion 122 and an outer peripheral end portion 124 (hereinafter also referred to as an "peripheral end portion") of the body 104. In one embodiment, the inner peripheral end portion 122 is configured to be coupled to the shaft 102 such that each of the plurality of main-flushing channels 120 is connected to a corresponding first opening 116. In one embodiment, the insulated layer 108a is configured to be disposed on a top surface 126 of the body 104 and the insulated layer 108b is configured to be disposed on a bottom surface 128 of the body 104. In one or more embodiments, the insulated layers 108a, 108b concur to the shape of the body 104.

The plurality of machining-inserts 106 is configured to be disposed on the peripheral end portion 124 of the body 104. In certain embodiments, the plurality of machining-inserts 106 is spaced apart from each other along the circumferential direction 103 of the electrode 100 and detachably coupled to the peripheral end portion 124. In certain embodiments, the spaced apart arrangement of the plurality of machining-inserts 106 may facilitate to mechanically interrupt the generation of constant primary arcs between a work piece (not shown) and the electrode 100. In the illustrated embodiment, the plurality of machining-inserts 106 is in a range from about 10 to about 20 and each of the plurality of machining-inserts 106 is a semi-circular component, which includes an inner end portion 130 and an outer end portion 132. The inner end portion 130 includes a sliding section, which snap fits with the portion of the body 104. Further, each of the plurality of machining-inserts 106 includes at least one third opening 134, which extends from the inner end portion 130 to the outer end portion 132. In one embodiment, the third opening 134 is configured to be connected to a corresponding main-flushing channel 120.

Figure 2:
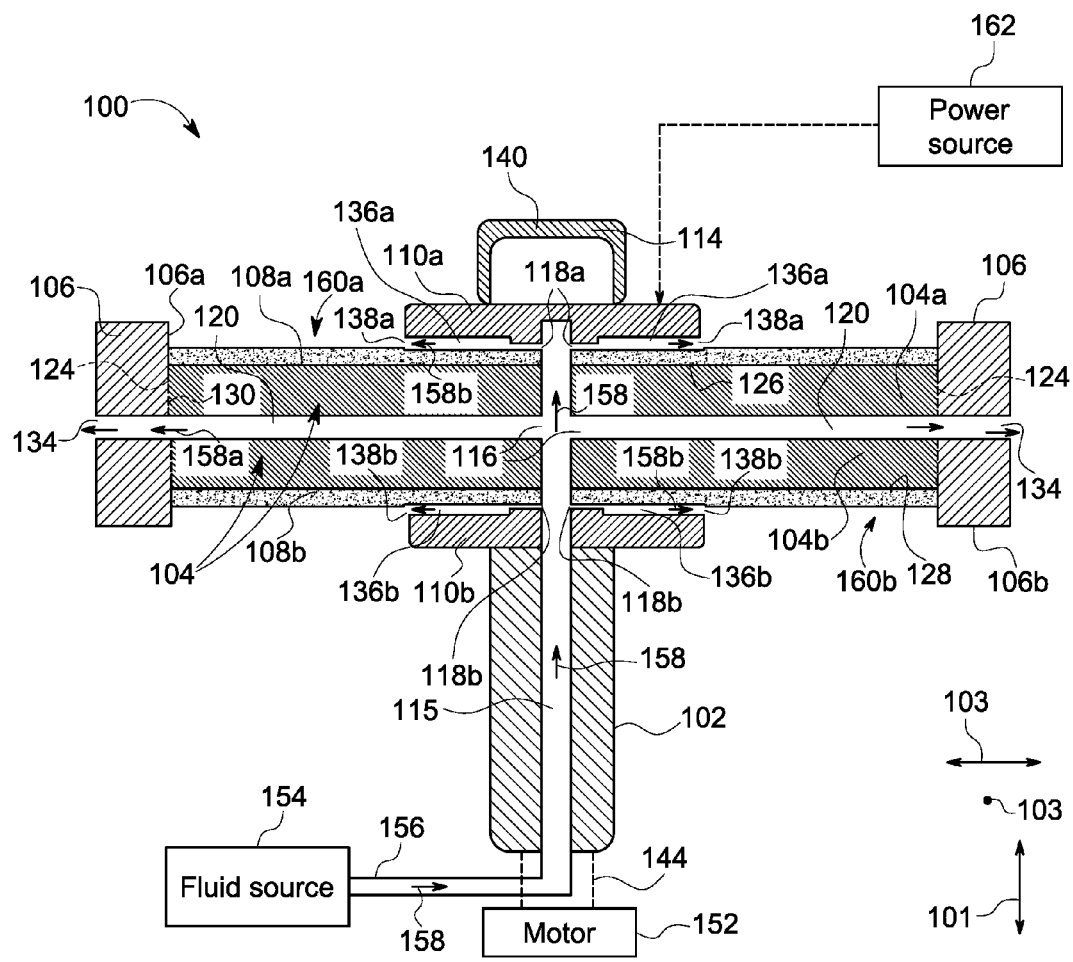
FIG. 2 is a schematic cross-sectional view of the electrode of FIG. 1.

In one embodiment, each of the first and second flushing covers 110a, 110b is a donut-shaped disk. Each of the first and second flushing covers 110a, 110b includes a corresponding plurality of side-flushing channels 136a (as shown in FIG. 2), 136b and a corresponding fourth opening 138a, 138b. The first flushing cover 110a is configured to be disposed on the top surface 126 of the body 104 such that each side-flushing channel 136a is connected to a corresponding second opening 118. Specifically, each side-flushing channel 136a is connected to the first set of second openings 118a. The first flushing cover 110a is specifically disposed on the insulated layer 108a and is configured to cover the inner peripheral end portion 122 located at the top surface 126 of the body 104. The second flushing cover 110b is configured to be disposed on the bottom surface 128 of the body 104 such that each side-flushing channel 136b is connected to a corresponding second opening 118. Specifically, each side-flushing channel 136b is connected to the second opening of the second set of second openings 118a. The second flushing cover 110b is specifically disposed on the insulated layer 108b and is configured to cover the inner peripheral end portion 122 located at the bottom surface 128 of the body 104.

In one embodiment, the plurality of main-flushing channels 120 and the plurality of side-flushing channels 136a, 136b extend along a longitudinal direction 105 of the electrode 100. The body 104 has a diameter "$D_1$" and each of the first and second flushing covers 110a, 110b has a diameter "$D_2$" different from the diameter "$D_1$". Specifically, the diameter "$D_1$" is greater than the diameter "$D_2$". In one embodiment, the body 104 has a first thickness "$T_1$" and each of the plurality of machining-inserts 106 has a second thickness "$T_2$", which is different from the first thickness "$T_1$". Specifically, the second thickness "$T_2$" is greater than the first thickness "$T_1$".

The electrode 100 further includes an end cover 140, a first O-ring 142a, a second O-ring 142b, a first set of keys 146a, a second set of keys 146b, a plurality of stop blocks 148, and a plurality of keys 150.

The end cover 140 is disposed on the first flushing cover 110a and coupled to the second end 114 of the shaft 102. Specifically, the first O-ring 142a is configured to be disposed between the end cover 140 and the first flushing cover 110a to generate a first sealing interface between the end cover 140 and the first flushing cover 110a. Similarly, the second O-ring 142b is configured to be disposed between a spindle 144 of the shaft 102 and the second flushing cover 110b to generate a second sealing interface between the spindle 144 and the second flushing cover 110b.

The first set of keys 146a is configured to be disposed between the shaft 102 and the first flushing cover 110a to rotatably connect the shaft 102 to the first flushing cover 110a. Similarly, the second set of keys 146b is configured to be disposed between the shaft 102 and the second flushing cover 110b to rotatably connect the shaft 102 to the second flushing cover 110b. Each of the plurality of stop blocks 148 is disposed on the peripheral end portion 124 of the body 104. Specifically, each of the plurality of stop blocks 148 is disposed between the mutually adjacent machining-inserts 106. Each stop block 148 is configured to prevent the corresponding machining-insert 106 to slide over the body 104. Each key 150 is disposed on a corresponding stop block 148 for rotatably connecting the stop block 148 to body 104.

FIG. 2 is a schematic cross-sectional view of the electrode 100 of FIG. 1. As discussed in the embodiment of FIG. 1, the electrode 100 includes the shaft 102, the body 104, the plurality of machining-inserts 106, the plurality of insulated layers 108a, 108b, the first flushing cover 110a, and the second flushing cover 110b.

The shaft 102 includes the channel 115, the plurality of first openings 116, and the plurality of second openings 118. The shaft 102 is coupled to a motor 152 and to a fluid source 154. Specifically, the motor 152 is operatively coupled to the spindle 144 of the shaft 102 and configured to drive the shaft 102. The fluid source 154 is coupled to the channel 115 via a tubing 156 and configured to supply a flushing fluid 158 to the electrode 100. In one or more embodiments, the flushing fluid 158 is a dielectric fluid.

The body 104 includes a first half portion 104a, a second half portion 104b coupled to the first half portion 104a to define the plurality of main-flushing channels 120 there between the first and second halve portions 104a, 104b. The plurality of machining-inserts 106 is disposed on the peripheral end portion 124 of the body 104. Each of the plurality of machining-inserts 106 includes at least one third opening 134 connected to a corresponding main-flushing channel 120. In one embodiment, the number of the third opening 134 in each machining-insert 106 is dependent on at least one a length, a pattern, and an angle of the corresponding main-flushing channel 120. In one embodiment, the pattern corresponds to the shape of the main-flushing channel 120, such a curved shaped channel, straight channel and the like. The angle corresponds to an opening angle of the main-flushing channel 120 at the inner end portion 130 of each machining-inserts 106.

The insulated layer 108a is disposed on the top surface 126 of the body 104 and the insulated layer 108b is disposed on the bottom surface 128 of the body 104. In one embodiment, the first flushing cover 110a is disposed on the top surface 126 to define a first recess portion 160a between the top portion 106a of the plurality of machining-inserts 106 and the first flushing cover 110a. Specifically, the first recess portion 160a is defined over the insulated layer 108a. Similarly, the second flushing cover 110b is disposed on the bottom surface 128 to define a second recess portion 160b between a bottom portion 106b of the plurality of machining-inserts 106 and the second flushing cover 110b. Specifically, the second recess portion 160b is defined over the insulated layer 108b. The first flushing cover 110a includes the plurality of side-flushing channels 136a and the plurality of fourth openings 138a, where each side-flushing channel 136a is connected to a corresponding second opening 118a. The second flushing cover 110b includes the plurality of side-flushing channels 136b and the plurality of fourth openings 138b, where each side-flushing channel 136b is connected to a corresponding second opening 118b. In one embodiment, at least one side-flushing channel of the plurality of side-flushing channels 136a, 136b includes a curved channel. The end cover 140 is disposed on the first flushing cover 110a and coupled to the second end 114 of the shaft 102.

During operation, the electrode 100 is placed proximate to a work piece (not shown) and power i.e. electric field is supplied to the electrode 100 and the work piece via a power source 162. Specifically, each machining-insert 106 is disposed facing the work piece. Further, the electrode 100 is rotated via the motor 152 and the flushing fluid 158 is supplied to the electrode 100 via the fluid source 154. Specifically, the body 104 is rotated through the shaft 102 coupled to the motor 152. The channel 115 receives the flushing fluid 158 from the fluid source 154. A portion 158a of the flushing fluid 158 enters the main-flushing channel 120 via the plurality of first openings 116 and another portion 158b of the flushing fluid 158 enters the side-flushing channels 136a, 136b via the plurality of second openings 118a, 118b respectively.

As the intensity of the electric field in a volume (space) between the corresponding machining-insert 106 and the workpiece increases, primary arcs gets generated between the electrode 100 and the work piece, thereby removing at least a portion of a material from the work piece through the primary arcs. The portion 158a of the flushing fluid 158 enters the plurality of machining-inserts 106 from a corresponding main-flushing channel 120. The third opening 134 of the corresponding machining-insert 106 is configured to inject the portion 158a of a flushing fluid 158 directly over the work piece for cooling the work piece and ejecting the removed portion (debris) of the material from the work piece.

The removed portion of the material may get deposited over the sidewalls of electrode 100. The insulated layer 108a, 108b prevents the generation of secondary arcs between the sidewalls of the electrode and the removed portion of the material. Further, the insulated layer 108a, 108b prevents drawing excessive electric field from the power source 162. Further, each fourth opening 138a, 138b of a corresponding first and second flushing cover 110a, 110b is configured to inject the other portion 158b of a flushing fluid 158 along the corresponding recess portion 160a, 160b to further eject the removed portion of the material. In one or more embodiments, the electrode 100 of the present disclosure may be used for grinding, deep slot cutting, material cut off, wedge cut, and the like.

During certain transient operating conditions, the machining-insert 106 may get worn out due to erosion of material from the machining-insert 106. During such conditions, the damaged machining-insert 106 may be easily removed from the body 104 and replaced with another machining-insert 106.

In one or more embodiments of the present technique, the electrode 100 functions like a simple centrifugal pump by injecting the flushing fluid directly on the work piece via the plurality of third openings 134. Thereby, the electrode 100 enables generation of a substantially higher flushing fluid pressure at the work piece, provides higher debris ejection forces, and supports higher material removal rates from the work piece.

Figure 3:
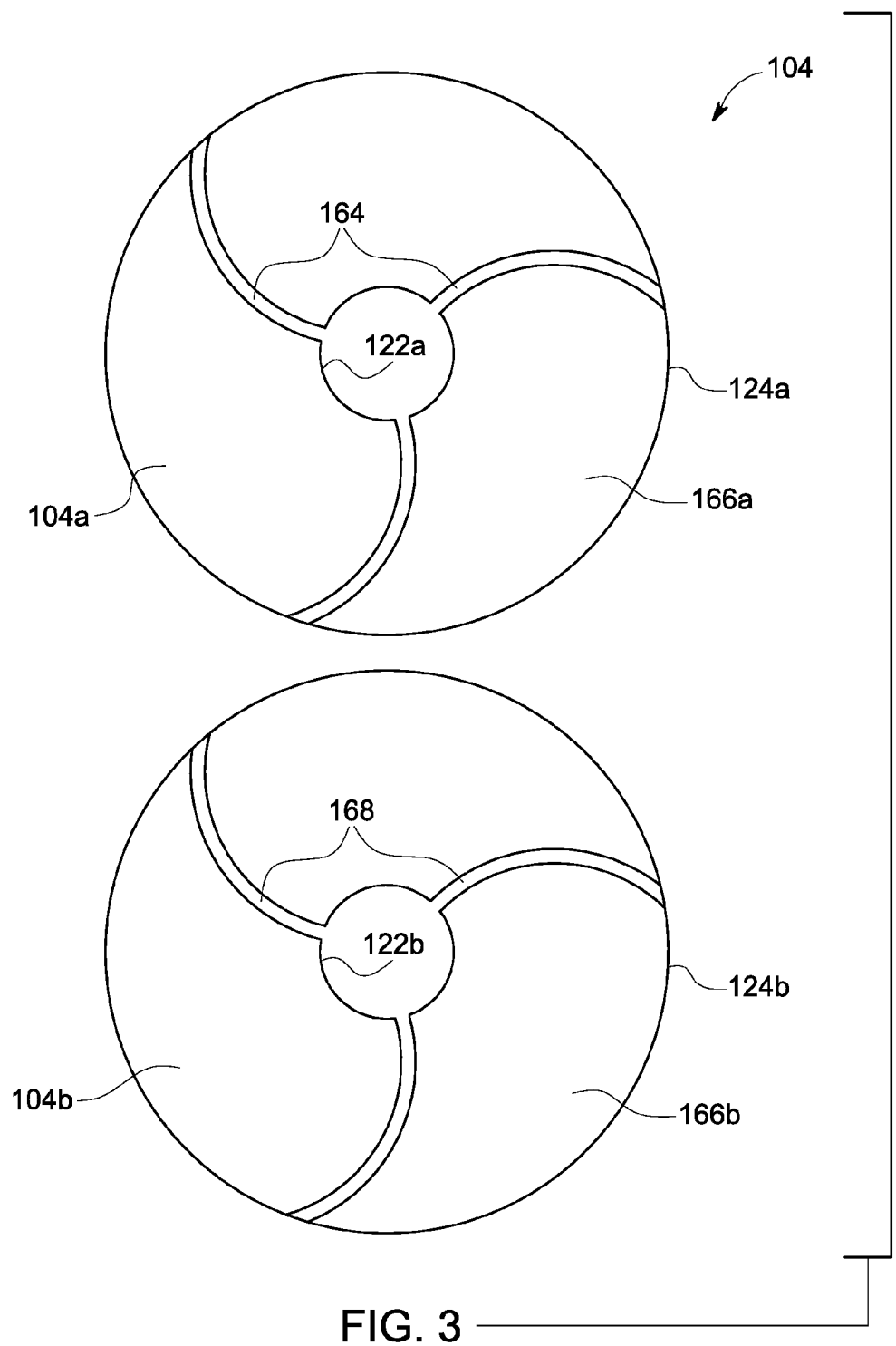
FIG. 3 is a schematic view of two halve portions of a body of the electrode of FIGS. 1 and 2.

FIG. 3 is a schematic view of two halve portions of the body 104 of the electrode 100 of FIGS. 1 and 2.

The body 104 includes a first half portion 104a and a second half portion 104b. In one embodiment, each of the first and second halve portions 104a, 104b has a donut-shaped disk having a corresponding inner peripheral end portion 122a, 122b and a corresponding outer peripheral end portion 124a, 124b. The first half portion 104a includes a plurality of first grooves 164 disposed on an inner surface 166a of the first half portion 104a. Similarly, the second half portion 104b includes a plurality of second grooves 168 disposed on an inner surface 166b of the second half portion 104b. In one embodiment, the first and second halve portions 104a, 104b are machined, for example grooved, to form the plurality of first grooves 164 and the plurality of second grooves 168 respectively. In the illustrated embodiment, each groove of the plurality of first grooves 164 and the plurality of second grooves 168 is a curved groove.

Figure 4:
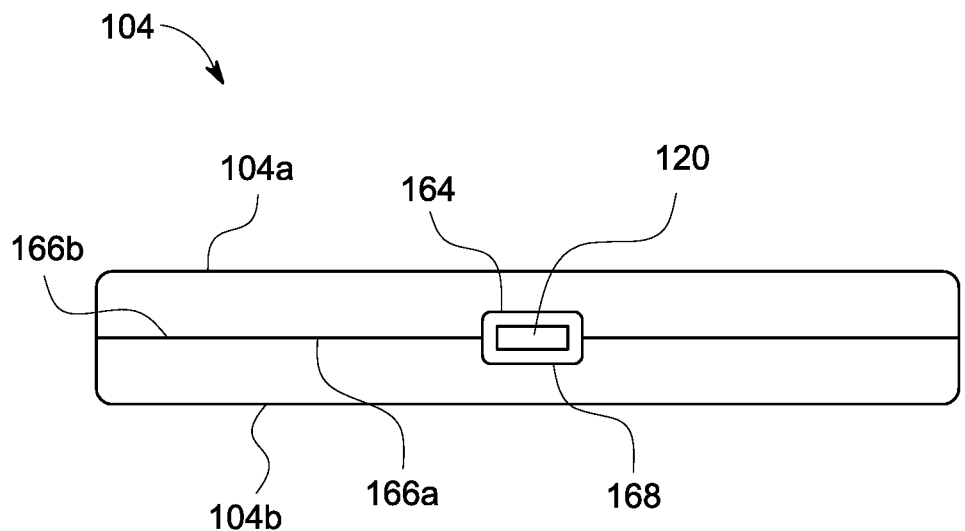
FIG. 4 is a schematic view of the body of the electrode of FIG. 3.

FIG. 4 is a schematic view of the body 104 of the electrode 100 of FIG. 3. In one embodiment, the inner surfaces 166a, 166b of the first half portion 104a and the second half portion 104b respectively are coupled to each other to form the body 104. Specifically, each first groove 164 overlaps with a corresponding second groove 168 to define the corresponding main-flushing channel 120 there between the first and second halve portions 104a, 104b. In one embodiment, each main-flushing channel 120 is a curved channel. In some other embodiments, at least one of the plurality of main-flushing channels 120 may be straight channel. In one embodiment, the first and second halve portions 104a, 104b are coupled to each other by brazing.

The fabrication of a substantially large and thin disk electrode 100 having the plurality of main-flushing channels 120 is difficult using traditional drilling methods. In one or more embodiments, grooving the halve portions 104a, 104b and brazing grooved faces to each other, with either i) a shifted non-alignment of the grooves or ii) an alignment of the grooves may result in easy fabrication of the body 104 having the plurality of main-flushing channels 120. It should be noted herein that the term a "substantially large and thin disk electrode" refers to the electrode having radius to thickness ratio of greater than 10.

Figure 5:
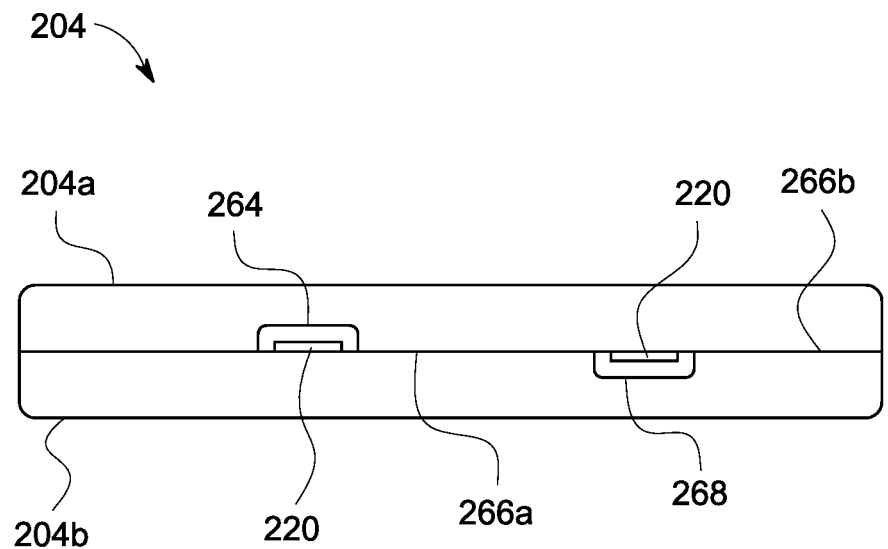
FIG. 5 is a schematic view of a body of an electrode of the present disclosure.

FIG. 5 is a schematic view of a body 204 of an electrode of the present disclosure. In the illustrated embodiment, the body 204 includes a first half portion 204a and a second half portion 204b. The first half portion 204a includes a plurality of first grooves 264 disposed on an inner surface 266a and the second half portion 204b includes a plurality of second grooves 268 disposed on an inner surface 266b. The inner surfaces 266a, 266b are coupled to each other to form the body 204. Specifically, each first groove 264 is offset from a corresponding second groove 268 to define the corresponding main-flushing channels 220 there between the first and second halve portions 204a, 204b. In such embodiments, each machining-insert may include two number of third openings, each connected to the corresponding main-flushing channel 220.

Figure 6:
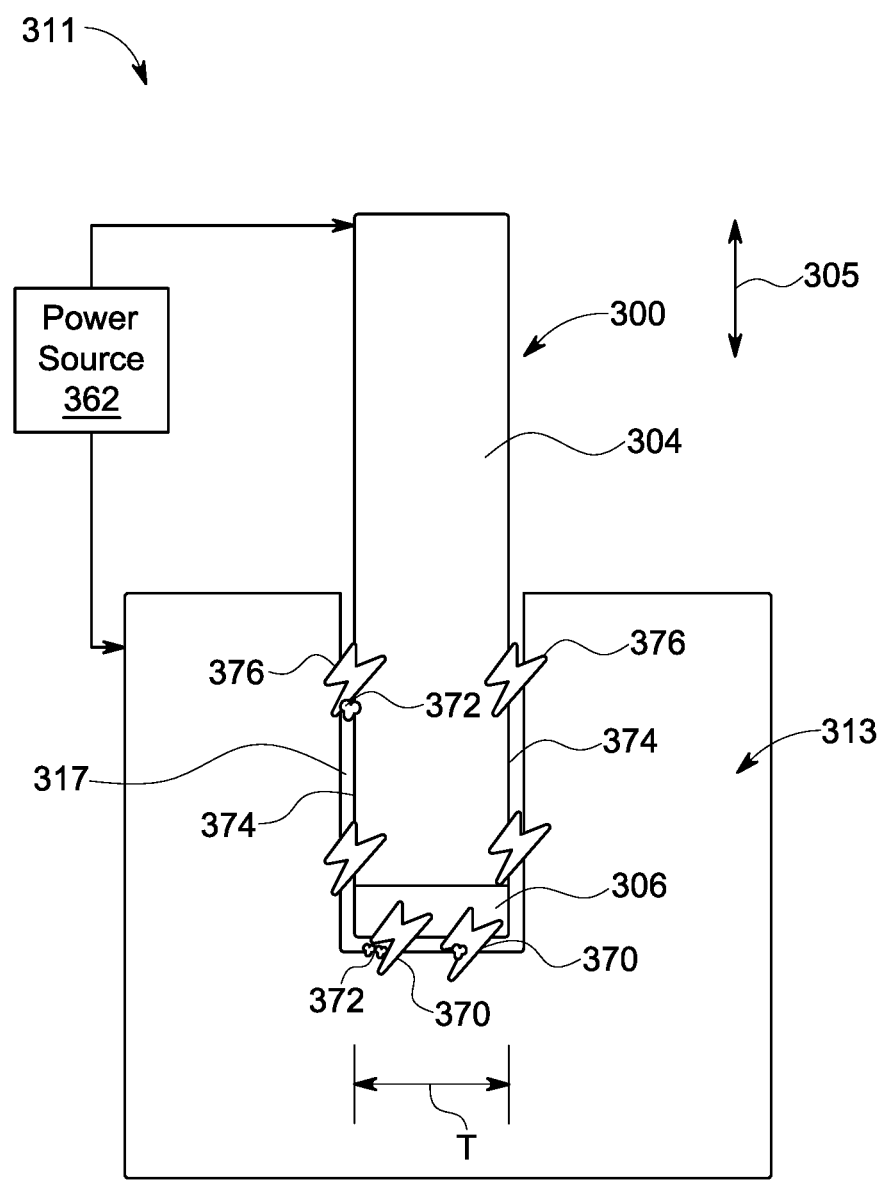
FIG. 6 is a block diagram of a conventional electro-erosion system.

FIG. 6 is a block diagram of a conventional electro-erosion system 301. The conventional electro-erosion system 311 includes an electrode 300, a work piece 313, and a power source 362. The electrode 300 is used for generating deep-cut 317 in the work piece 313. The electrode 300 may include a machining-insert 306 coupled to the peripheral end portion of a body 304 of the electrode 300. The machining-insert 306 has a uniform thickness "T".

During operation, the electrode 300 is disposed proximate to the work piece 313 and an electric field is supplied to the electrode 300 and the work piece 313 via the power source 364. As the intensity of the electric field in a volume between the machining-insert 306 and the work piece 313 increases, primary arcs 370 gets generated between the electrode 300 and the work piece 313, thereby removing at least a portion of a material 372 from the work piece 313 through the primary arcs 370. The removed portion of the material 372 may get deposited or accumulated over sidewalls 374 of the electrode 300, thereby generating secondary arcs 376 between the electrode 300 and the removed portion of the material 372 or the sidewalls 374 of the electrode 300. The accumulation of the removed portion of the material 372 may result in drawing substantially more electric field from the power source 364 and may block ejection of the removed portion of the material 372 by flushing fluids, thereby affecting the material removal rate of the electrode 300.

Figure 7:
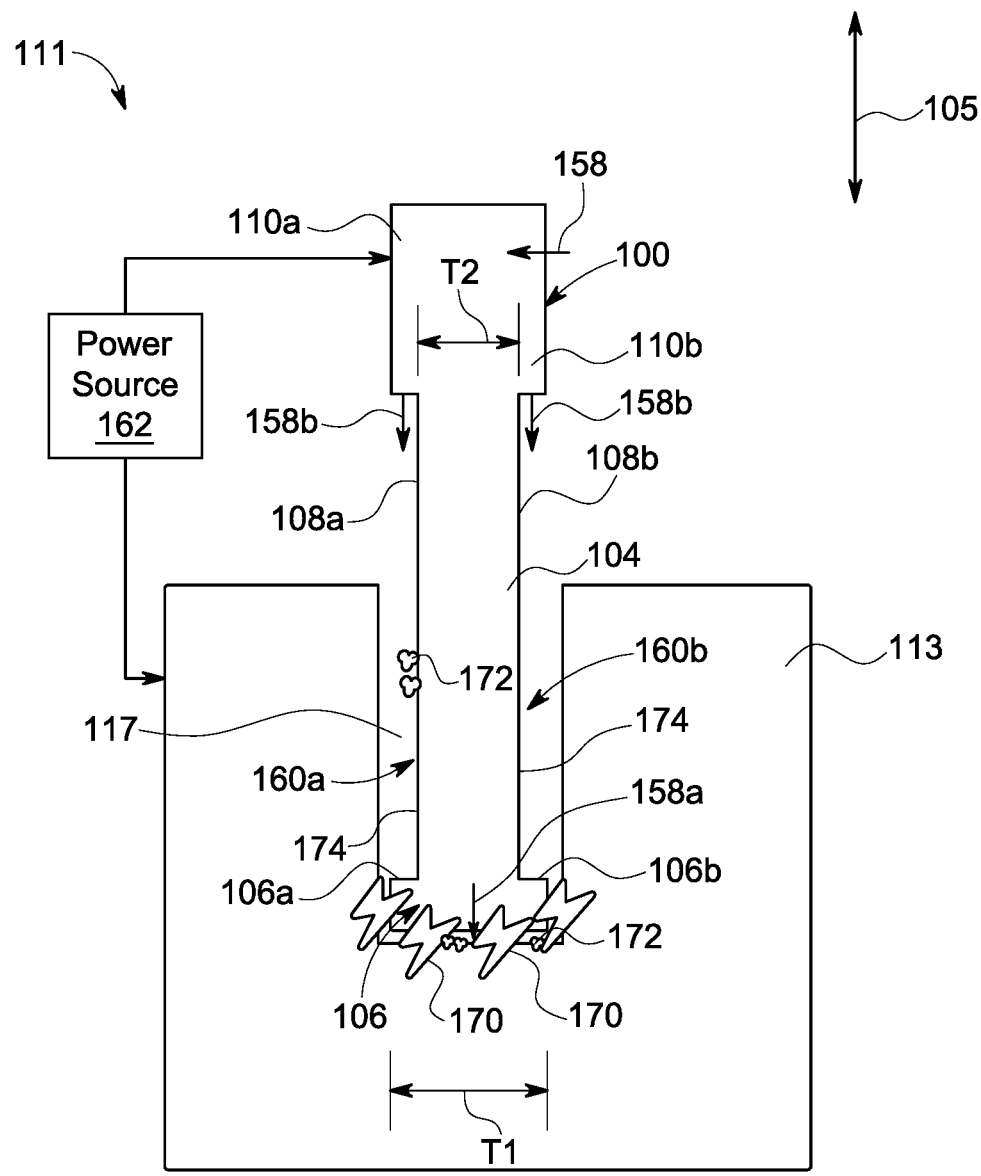
FIG. 7 is a block diagram of an electro-erosion system using the electrode of FIG. 1.

FIG. 7 is a block diagram of an electro-erosion system 111 using the electrode 100 of FIG. 1. It should be noted herein that the illustrated embodiment of FIG. 7 shows only a portion of the electrode 100 for ease of illustration.

In one embodiment, the electro-erosion system 111 includes the electrode 100, a work piece 113, and a power source 162. In certain embodiments, the power source 162 may be a direct current (DC) source. The electrode 100 is used for generating deep-cut 117 in the work piece 113. The machining-insert 106 having a first thickness "$T_1$" is detachably coupled to the peripheral end portion of the body 104 of the electrode 100. The body 104 having a second thickness "$T_2$" is coupled to the shaft (not shown). The insulated layer 108a is disposed on the top surface of the body 104 and the other insulated layer 108b is disposed on the bottom surface of the body 104. The first flushing cover 110a is disposed on the top surface of the body 104 to define a first recess portion 160a between the top portion 106a of the machining-insert 106 and the first flushing cover 110a. The second flushing cover 110b is disposed on the bottom surface of the body 104 to define the second recess portion 160b between the bottom portion 106b of the machining-insert 106 and the second flushing cover 110b. Thus, the electrode 100 provides more space between the work piece 113 and sidewalls 174 of the electrode 100, by defining the first recess portion 160a and the second recess portion 160b there between.

During operation, the electrode 100 is disposed proximate to the work piece 113 and an electric field is supplied to the electrode 100 and the work piece 113 via the power source 162. As the intensity of the electric field in a volume between the machining-insert 106 and the work piece 113 increases, primary arcs 170 gets generated between the electrode 100 and the work piece 113, thereby removing at least a portion of a material 172 from the work piece 113 through the primary arcs 170. The portion 158a of the flushing fluid 158 is injected via the third opening (not labeled) disposed in the machining-insert 106 for ejecting the removed portion of the material 172 from a cutting zone. The removed portion of the material 172 may get deposited or accumulated over the sidewalls 174 (non-cutting zone) of the electrode 100. The other portion 158b of the of the flushing fluid 158 is injected via the fourth openings (not labeled) disposed in the first and second flushing covers 110a, 110b for ejecting the removed portion of the material 172 from the sidewalls 174. The insulated layers 108a, 108b prevents generation of secondary arcs between the sidewalls 174 and the work piece 113.

Advantageously, the methods described herein provide an improved electro-erosion electrode with unique flushing geometries and a method for fabricating such an electrode. Further, the methods described herein allow for easier fabrication of a substantially large and thin electrode, with multiple flushing channels, compared to the traditional drilling methods used for fabricating the electrode.

In one or more embodiments, the electrode 100 of the present disclosure facilitates i) substantially faster ejection of the removed portion of the material 172, ii) higher material removal rate, iii) prevent blocking of the space between the sidewalls 174 and the work piece 113, iv) prevent generation of secondary arcs between the electrode 100 and the work piece 113, v) drawing substantially less electric field from the power source 162, and vi) cooling the work piece 113 and the electrode 100.

Figure 8:
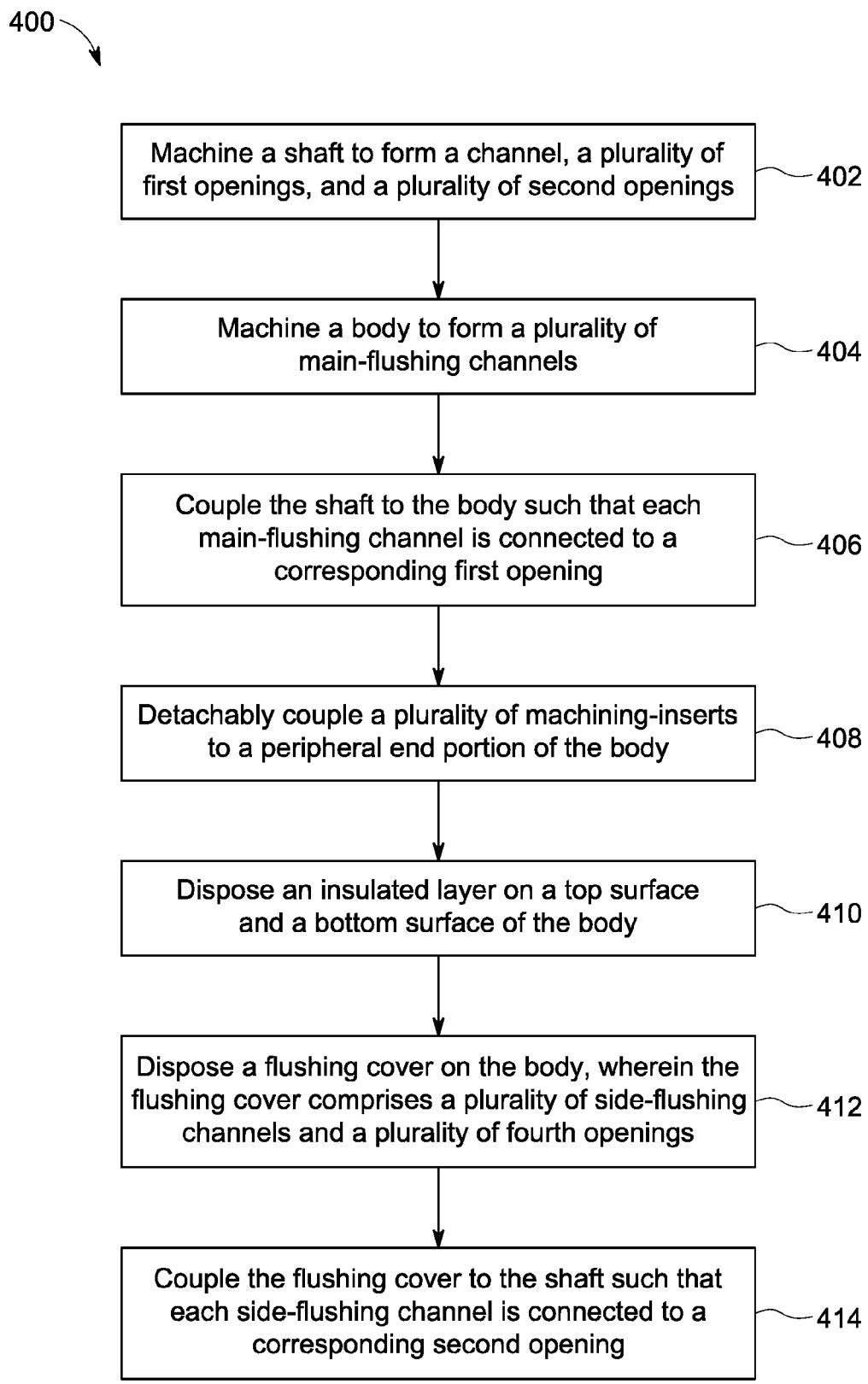
FIG. 8 is a flow diagram of a method for manufacturing an electrode of the present disclosure.

FIG. 8 is a flow diagram of a method 400 for manufacturing an electrode described herein.

The method 400 involves machining a shaft to form a channel, a plurality of first openings, and a plurality of second openings in step 402. In certain embodiments, the channel is a through-hole extending along a lateral direction and between a first end and a second end of the shaft. In such embodiment, each opening of the plurality of first and second openings is connected to the channel.

The method 400 further involves machining a body to form a plurality of main-flushing channels, wherein each main-flushing channel is connected to a corresponding first opening in step 404. In one embodiment, the step 404 involves machining an inner surface of a first half portion and a second half portion of the body to form a plurality of first grooves in the first half portion and a plurality of second grooves in the second half portion. Further, the step 404 involves coupling the inner surfaces of the first half portion and the second half portion to each other to form the body including the plurality of main-flushing channels defined there between the first half portion and the second half portion. In one embodiment, the first and second halve portions are coupled to each other by brazing. In certain embodiments, the each main-flushing channel extends along a longitudinal direction of the electrode.

In one embodiment, coupling the inner surfaces of the first half portion and the second half portion includes overlapping each first groove with a corresponding second groove to define the corresponding main-flushing channel. In another embodiment, coupling the inner surfaces of the first half portion and the second half portion includes offsetting each first groove from a corresponding second groove to define the corresponding main-flushing channel.

The method 400 further involves coupling the shaft to the body such that each main-flushing channel is connected to a corresponding first opening in the shaft, in step 406. The method 400 involves detachably coupling a plurality of machining-inserts to a peripheral end portion of the body in step 408. In one embodiment, the plurality of machining-inserts is spaced apart from each other along a circumferential direction of the electrode. In one embodiment, each machining-insert includes at least one third opening connected to a corresponding main-flushing channel.

The method 400 further involves disposing an insulated layer on a top surface and a bottom surface of the body in step 410. In one embodiment, the disposing the insulated layer includes spraying or coating the insulation material on the top and bottom surfaces of the body. The insulation material may be a dielectric material.

The method further involves disposing a flushing cover on the body in step 412. In one embodiment, the flushing cover includes a plurality of side-flushing channels and a plurality of fourth openings. Further, the method 400 involves coupling the flushing cover to the shaft such that each side-flushing channel is connected to a corresponding second opening in step 414.

In one embodiment, the step 412 and 414 involve i) disposing a first flushing cover of the flushing cover, on the top surface of the body and coupling the first flushing cover to the shaft such that each side-flushing channel of the first flushing cover is connected to a first set of second openings of the plurality of second openings. The step 412 and 414 further involve i) disposing a second flushing cover of the flushing cover, on the bottom surface of the body and coupling the second flushing cover to the shaft such that each side-flushing channel of the second flushing cover is connected to a second set of second openings of the plurality of second openings. In such an embodiment, the plurality of first openings is disposed between the first and second set of second openings. Further, each side-flushing channel extends along the longitudinal direction.

In certain embodiments, by using the brazing technique to couple the two halve portions of the body with the shaft, the electrical conductivity of the electrode may be maintained, structural integrity of the electrode may be improved, and pressure of the flushing fluid may be conserved through elimination of any leakage flow paths in the electrode.

Figure 9:
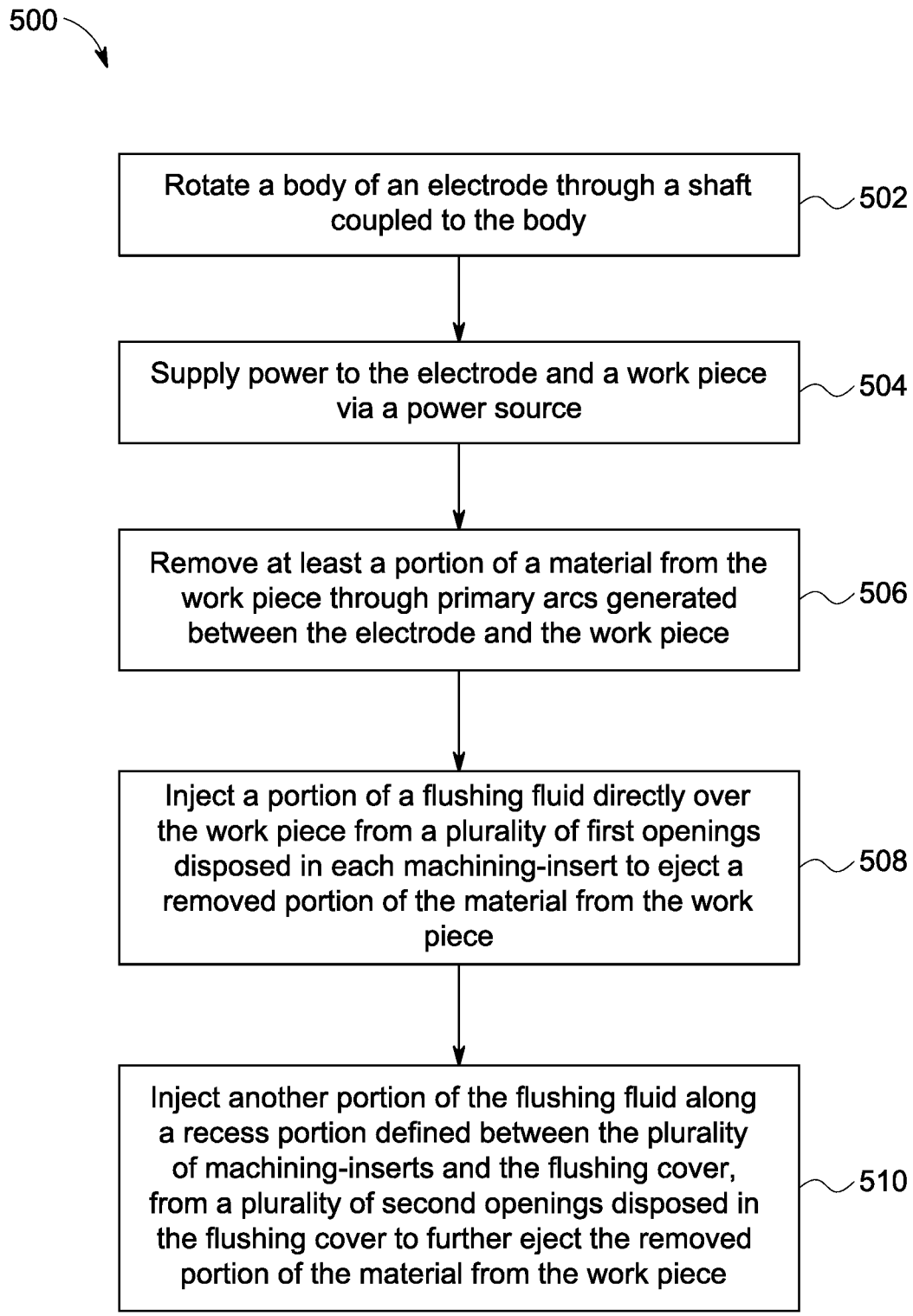
FIG. 9 is a flow diagram of a method for operating an electrode in an electro-erosion process described herein.

FIG. 9 is a flow diagram of a method 500 for operating an electrode in an electro-erosion process described herein.

The method 500 involves rotating a body of an electrode through a shaft coupled to the body in step 502. In one embodiment, the electrode includes the shaft, a flushing cover disposed on the body and coupled to the shaft, and a plurality of machining-inserts spaced apart from each other along a circumferential direction of the electrode and detachably coupled to a peripheral end portion of the body.

The method 500 further involves supplying power to the electrode and a work piece via a power source in step 504. Further, the method involves removing at least a portion of a material from the work piece through primary arcs generated between the electrode and the work piece in step 506.

The method 500 further involves injecting a portion of a flushing fluid directly over the work piece from a plurality of first openings disposed in each machining-insert to eject a removed portion of the material from the work piece in step 508. It should be noted herein that the plurality of first openings corresponds to the plurality of third openings as discussed in the embodiments of FIGS. 1 and 2. In one embodiment, each first opening is connected to a main-flushing channel disposed in the body and to a channel disposed in the shaft.

The method 500 further involves injecting another portion of the flushing fluid along a recess portion defined between the plurality of machining-inserts and the flushing cover, from a plurality of second openings disposed in the flushing cover to further eject the removed portion of the material from the work piece in step 510. It should be noted herein that the plurality of second openings corresponds to the plurality of fourth openings as discussed in the embodiments of FIGS. 1 and 2. In one embodiment, each second opening is connected to a side-flushing channel disposed in the flushing cover and to the channel disposed in the shaft.

The method 500 further involves preventing secondary arcs generated between the electrode and the work piece or the removed portion of the material through an insulated layer disposed on a top surface and a bottom surface of the body.

In accordance with one or more embodiments discussed herein, an electrode is configured for grinding, deep slot cutting, material cut off, and wedge cut. The electrode having a through-shaft and a through-body flushing capacity facilitates to achieve higher material removal rate and efficient way of flushing away a removed portion of the material from a work piece.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. An electrode for an electro-erosion process, comprising:
    a shaft comprising a channel, a plurality of first openings, and a plurality of second openings, wherein each opening of the plurality of first and second openings is connected to the channel;
    a body coupled to the shaft, wherein the body comprises a plurality of main-flushing channels, wherein each main-flushing channel is connected to a corresponding first opening;
    a plurality of machining-inserts spaced apart from each other along a circumferential direction of the electrode and detachably coupled to a peripheral end portion of the body, wherein each machining-insert comprises at least one third opening connected to a corresponding main-flushing channel;

an insulated layer disposed on a top surface and a bottom surface of the body; and a flushing cover disposed on the body and coupled to the shaft, wherein the flushing cover comprises a plurality of side-flushing channels and a plurality of fourth openings, wherein each side-flushing channel is connected to a corresponding second opening.

2. The electrode of claim 1, wherein the body has a first thickness and each machining-insert has a second thickness different from the first thickness.

3. The electrode of claim 2, wherein the flushing cover comprises a first flushing cover and a second flushing cover, wherein the first flushing cover is disposed on the top surface to define a first recess portion between a top portion of the plurality of machining-inserts and the first flushing cover, wherein the second flushing cover is disposed on the bottom surface to define a second recess portion between a bottom portion of the plurality of machining-inserts and the second flushing cover.

4. The electrode of claim 3, wherein the plurality of second openings comprises a first set of second openings and a second set of second openings, wherein the plurality of first openings is disposed between the first and second set of second openings, wherein each side-flushing channel in the first flushing cover is connected to a corresponding second opening in the first set of second openings, and wherein each side-flushing channel in the second flushing cover is connected to a corresponding second opening in the second set of second openings.

5. The electrode of claim 1, wherein at least one main-flushing channel of the plurality of main-flushing channels comprises a curved channel.

6. The electrode of claim 1, wherein at least one side-flushing channel of the plurality of side-flushing channels comprises a curved channel.

7. The electrode of claim 1, wherein the body comprises a first half portion and a second half portion coupled to the first half portion to define the plurality of main-flushing channels there between the first half portion and the second half portion.

8. The electrode of claim 7, Wherein the first half portion comprises a plurality of first grooves disposed on an inner surface of the first half portion and the second half portion comprises a plurality of second grooves disposed on an inner surface of the second half portion, wherein the inner surface of the first half portion and the second half portion are coupled to each other such that each first groove overlaps a corresponding second groove to define the corresponding main-flushing channel.

9. The electrode of claim 7, wherein the first half portion comprises a plurality of first grooves disposed on an inner surface of the first half portion and the second half portion comprises a plurality of second grooves disposed on an inner surface of the second half portion, wherein the inner surface of the first half portion and the second half portion are coupled to each other such that each first groove is offset from a corresponding second groove to define the corresponding main-flushing channel.

10. The electrode of claim 1, wherein number of the third opening in each machining-insert is dependent on at least one a length, a pattern, and an angle of the corresponding main-flushing channel.

11. The electrode of claim 1, wherein the channel extends along a lateral direction of the electrode and wherein the plurality of first openings and the plurality of second openings are disposed spaced apart from each other along a circumferential direction of the electrode.

12. The electrode of claim 1, wherein the plurality of main-flushing channels and the plurality of side-flushing channels extend along a longitudinal direction of the electrode.

13. The electrode of claim 1, wherein the plurality of machining-inserts is in a range from 10 to 20.

14. A method comprising:

rotating a body of an electrode through a shaft coupled to the body, wherein the electrode comprises the shaft, a flushing cover disposed on the body and coupled to the shaft, and a plurality of machining-inserts spaced apart from each other along a circumferential direction of the electrode and detachably coupled to a peripheral end portion of the body;

supplying power to the electrode and a work piece via a power source;

removing at least a portion of a material from the work piece through primary arcs generated between the electrode and the work piece;

injecting a portion of a flushing fluid directly over the work piece from a plurality of first openings disposed in each machining-insert to eject a removed portion of the material from the work piece, wherein each first opening is connected to a main-flushing channel disposed in the body and to a channel disposed in the shaft; and injecting another portion of the flushing fluid along a recess portion defined between the plurality of machining-inserts and the flushing cover, from a plurality of second openings disposed in the flushing cover to further eject the removed portion of the material from the work piece, wherein each second opening is connected to a side-flushing channel disposed in the flushing cover and to the channel disposed in the shaft.

15. The method of claim 14, further comprising preventing secondary arcs generated between the electrode and the work piece or the removed portion of the material through an insulated layer disposed on a top surface and a bottom surface of the body.

* * * * *